O. F. Steadman.
Wash Boiler.
No. 82,656. Patented Sept. 29, 1868.

Witnesses:
Leofold Ever
Wm. Wansleben

Inventor:
O. F. Stedman
per
Alexander Mason
Atty

UNITED STATES PATENT OFFICE.

O. F. STEDMAN, OF WESTFIELD, NEW YORK.

IMPROVEMENT IN WASH-BOILERS.

Specification forming part of Letters Patent No. 82,656, dated September 29, 1868; antedated June 2, 1868.

*To all whom it may concern:*

Be it known that I, O. F. STEDMAN, of Westfield, in the county of Chautauqua, and in the State of New York, have invented certain new and useful Improvements in Wash-Boilers; and do hereby declare that the following is a full, clear, and exact description thereof, reference being had to the accompanying drawings, and to the letters of reference marked thereon.

The nature of my invention consists in the construction of a concave plate under a perforated movable bottom, in combination with one or more tubes passing through said perforated bottom and bent at the top inward and placed on the bottom of a wash-boiler, the object thereof being to conduct the steam generated at the bottom of the boiler to the tubes and force it with the hot suds, by the action of the fire, through these tubes, pouring it upon the clothes, which are placed on the perforated bottom, and thereby forcing it through the fabric, cleansing it thoroughly without any rubbing and with astonishing rapidity.

In order to enable others skilled in the art to make and use my invention, I will now proceed to describe its construction and operation, referring to the annexed drawings, which form a part of this specification, and in which—

Figure 1:
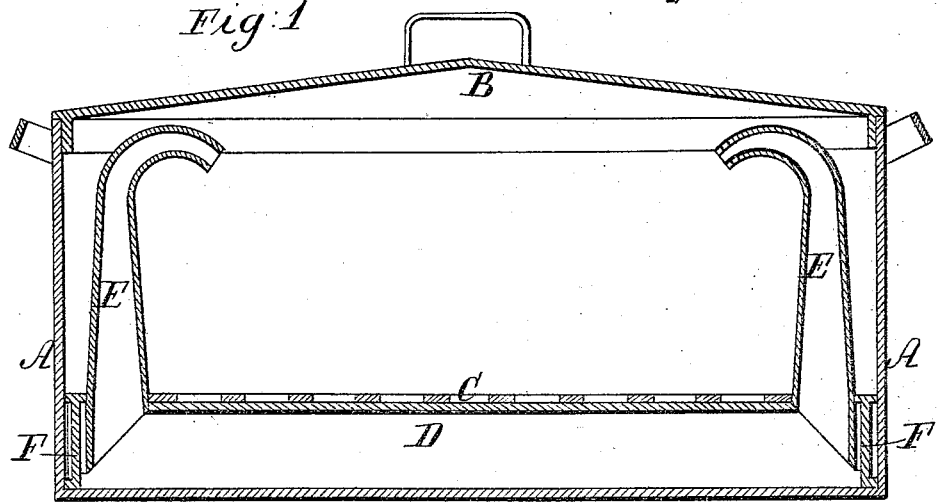
Figure 2:
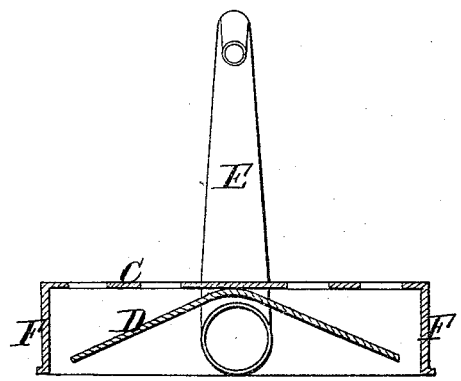

Figure 1 is a longitudinal section, and Fig. 2 a vertical section of my improvement.

A represents an ordinary wash-boiler, and B the cover thereto. C is a movable perforated bottom, with sides F F, so constructed as to fit on the bottom and close around the sides of the boiler. Under this perforated bottom is a concave plate, D, the ends of which are fastened to the sides F. The lower edges of its sides, however, do not extend as far as the sides F, but have a space between them, as shown in Fig. 2.

Through each end of the concave plate D is a tube, E, which is wider at the bottom than at the top, and so constructed that the steam generated at the bottom of the boiler and conducted along the upper ridge of said plate may easily pass into the same.

The tube passes through the ends of the perforated bottom C, extending upward, and its upper end bent inward toward the center of the boiler, so that steam and suds which are forced through it are poured on the clothes placed on the perforated bottom.

The concave plate D, with the tubes E, may be secured to the bottom or ends of the boiler instead of to the sides of the perforated bottom.

I do not claim the arrangement of the perforated bottom C, nor its pipes E, as shown in the patent of M. W. Stapler, of February 12, 1867.

My improvement consists in the use of the concave plate arranged under the perforated plate C, attached to the sides F in the manner herein described, for conducting the steam directly to the tapering pipes.

Having thus fully described my invention, what I claim as new, and desire to secure by Letters Patent, is—

The concave plate D, in combination with the tube or tubes E and perforated bottom C, constructed and operating substantially as and for the purposes herein set forth.

In testimony that I claim the foregoing invention I have hereunto set my hand this 15th day of May, 1868.

O. F. STEDMAN.

Witnesses:
A. L. WELLS,
M. A. DRIGGS.